US012054167B2

(12) United States Patent
Ucar et al.

(10) Patent No.: US 12,054,167 B2
(45) Date of Patent: Aug. 6, 2024

(54) RESOLVING VEHICLE APPLICATION VERSION DIFFERENCES

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Onur Altintas, Mountain View, CA (US)

( * ) Notice: Subject to any disclaimer, the term of this patent is extended or adjusted under 35 U.S.C. 154(b) by 530 days.

(21) Appl. No.: 17/174,338

(22) Filed: Feb. 11, 2021

(65) Prior Publication Data
US 2022/0250636 A1 Aug. 11, 2022

(51) Int. Cl.
*B60W 50/06* (2006.01)
*G06F 8/65* (2018.01)
(Continued)

(52) U.S. Cl.
CPC .............. *B60W 50/06* (2013.01); *G06F 8/71* (2013.01); *H04L 67/1097* (2013.01);
(Continued)

(58) Field of Classification Search
CPC ............. B60W 50/06; B60W 2556/20; B60W 2556/65; G06F 8/71; G06F 8/65;
(Continued)

(56) References Cited

U.S. PATENT DOCUMENTS 7,698,698 B2 4/2010 Skan
7,913,242 B2 3/2011 Holland
(Continued)

FOREIGN PATENT DOCUMENTS

CA 2357240 7/2010
CN 109582328 4/2019
(Continued)

OTHER PUBLICATIONS

"Virtual Edge Computing Using Vehicular Micro Clouds" by F. Dressler et al., 2019 International Conference on Computing, Networking and Communications (ICNC): Invited Symposium, Feb. 18-21, 2019 (Year: 2019).*

(Continued)

*Primary Examiner* — Peter D Nolan
*Assistant Examiner* — Tanya C Sienko
(74) *Attorney, Agent, or Firm* — Burbage Law, P.C.; Jon-Michael Burbage

(57) ABSTRACT

The disclosure includes embodiments for resolving vehicle application version differences for connected vehicles. A method includes determining a common vehicle application that is installed in both a remote connected vehicle and an ego vehicle and identifying version differences in a common vehicle application installed in both the ego vehicle and the remote connected vehicle. The method includes forming a vehicular micro cloud. The method includes determining a maximum possible functionality of the common vehicle application. The method includes determining a set of tasks to be completed to achieve the maximum possible functionality. The method includes assigning a first subset of the set of tasks to the ego vehicle and a second subset of the set of tasks to the remote connected vehicle. The method includes using the vehicular micro cloud to cause the ego vehicle to complete the first subset and the remote connected vehicle to complete the second subset.

20 Claims, 5 Drawing Sheets

(51) Int. Cl.
*G06F 8/71* (2018.01)
*H04L 67/1097* (2022.01)
*H04L 67/125* (2022.01)
*H04W 4/44* (2018.01)
*H04W 4/46* (2018.01)

(52) U.S. Cl.
CPC ............. *H04L 67/125* (2013.01); *H04W 4/44* (2018.02); *H04W 4/46* (2018.02); *B60W 2556/20* (2020.02); *B60W 2556/65* (2020.02); *G06F 8/65* (2013.01)

(58) Field of Classification Search
CPC .... H04L 67/1097; H04L 67/125; H04W 4/44; H04W 4/46
See application file for complete search history.

(56) References Cited

U.S. PATENT DOCUMENTS

| | | | |
|---|---|---|---|
| 8,190,322 | B2 | 5/2012 | Lin et al. |
| 9,464,905 | B2 | 10/2016 | Lewis et al. |
| 10,165,084 | B2 | 12/2018 | Moeller et al. |
| 2018/0300964 | A1* | 10/2018 | Lakshamanan ....... G06F 9/5027 |
| 2019/0079659 | A1* | 3/2019 | Adenwala ........... G06F 3/04842 |
| 2019/0132706 | A1* | 5/2019 | Altintas .................. H04W 4/40 |
| 2019/0311270 | A1 | 10/2019 | Chen et al. |
| 2019/0318620 | A1* | 10/2019 | Yang ...................... G08G 1/164 |
| 2020/0050492 | A1* | 2/2020 | Shifman ................ H04L 67/10 |
| 2022/0198839 | A1* | 6/2022 | Santamala .............. H04W 4/44 |

FOREIGN PATENT DOCUMENTS

| | | |
|---|---|---|
| CN | 106250170 | 10/2019 |
| CN | 110809904 | 2/2020 |
| DE | 102018205615 | 10/2019 |
| EP | 1233636 | 2/2003 |
| WO | 2019187652 | 10/2019 |

OTHER PUBLICATIONS

"Mobile Edge Intelligence and Computing for the Internet of Vehicles" J. Zhang and K.B. Letaief, arXiv: 1906.00400v1 [cs. NI] Jun. 2, 2019 (Year: 2019).*
International Preliminary Report on Patentability for PCT/FI2021/050896 (Year: 2023).*

* cited by examiner

RESOLVING VEHICLE APPLICATION VERSION DIFFERENCES

BACKGROUND

The specification relates to resolving vehicle application version differences for connected vehicles.

Modern vehicles broadcast V2X messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." ADAS systems and automated driving systems are examples of "vehicle applications." Other types of vehicle applications are possible. A vehicle application includes code and routines that provide driving or vehicular functionality to a vehicle.

A particular vehicle that includes these vehicle applications is referred to herein as an "ego vehicle" and other vehicles in the vicinity of the ego vehicle are referred to as "remote vehicles," "remote connected vehicles."

Software developers add new or different features to vehicle applications over time. Software developers also modify old features or fix bugs that are discovered over time. A first version of a vehicle application is referred to herein as "version 1" or "Ver1," a second version of a vehicle application is referred to as "version 2" or "Ver2," a third version of a vehicle application is referred to as "version 3" or "Ver3," and so on. Version 3 of a vehicle application has differences than version 1 of the same application. For example, version 3 has new or different features relative to version 1, or it may include bug fixes or modifications to old features that are common to both version 3 and version 1.

SUMMARY

Connected vehicles interact or cooperate with one another on a roadway using their common vehicle applications. Specifically, the common vehicle applications themselves interact or cooperate with one another to provide their vehicle functionality using the communication unit of their respective connected vehicles. A problem is that vehicle applications are unable to interact or cooperate with one another well if they are different versions of the same vehicle application.

For example, an ego vehicle includes version 3 of a vehicle application and a remote vehicle includes version 1 of the same vehicle application (i.e., a "common vehicle application" as used herein). Assume that the common vehicle application is an ADAS system for managing a four-way stop sign at an intersection, and the ego vehicle is located in a northbound lane of the intersection whereas the remote vehicle is located in a southbound lane of the intersection. Version 3 is the latest version of the vehicle application. Ideally, version 3 of the vehicle application and version 1 of the vehicle application would include a similar approach for handling this intersection so that they could each accurately estimate one another's future behavior. However, this is not likely or guaranteed since they are different versions of the same application. Ordinarily in software development, this problem is fixed by providing a software patch to the remote vehicle so that version 1 of the vehicle application is updated to version 3. However, this is not practical in roadway driving scenarios because software patches take time, and driving scenarios are typically fast paced. What is needed is a way to modify the functionality of version 1 of the vehicle application installed in the remote vehicle without the use of a software patch so that version 1 of the vehicle application behaves as similar as possible to the functionality of version 3 of the vehicle application given the hardware and software which is onboard the remote vehicle.

The resolver system described herein beneficially solves this problem, as well as others, by providing code and routines which are operable to modify the functionality of one or more versions of a vehicle application, which are onboard one or more connected vehicles, without the use of a software patch so that the one or more versions cooperate with one another to provide the maximum possible functionality of the vehicle application given the hardware and software which is onboard the one or more connected vehicles in which the one or more versions reside.

One type of V2X message is a Vehicle-to-Vehicle (V2V) message. Multiple classes of wireless V2V messages are being standardized in the United States and Europe. Some of the V2V messages allow for a higher level of cooperation (and conflict avoidance) between vehicles. Examples of such standardized V2V messages include cellular-V2X (C-V2X) messages. Some of these V2X messages include rich data sets describing the roadway environment, and therefore allow for a higher level of situational awareness about the roadway environment. A V2X message that includes a rich data set is described in some embodiments as a Basic Safety Message (BSM). In some embodiments, BSMs are transmitted via C-V2X. These V2X messages offer benefits in cooperation and awareness for road users. BSMs include a payload that includes the sensor measurements, among other information. The payload includes V2X data. V2X data (see, e.g., the V2X data 133 depicted in FIG. 1) includes digital data that describes, among other things, one or more of the following: (1) digital data that describes the sensor measurements of the vehicle that transmits the BSM (see, e.g., the remote sensor data 197 depicted in FIG. 1); (2) digital data that describes a list of vehicle applications installed in the vehicle that transmits the BSM, as well as the version of each of these applications (see, e.g., the remote application data 167 depicted in FIG. 1); and (3) digital data that describes the hardware capabilities of the vehicle that transmits the BSM (see, e.g., the resource data 155 depicted in FIG. 1).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by a processor of an ego vehicle. The method also includes determining a common vehicle application that is installed in both a remote connected vehicle and an ego vehicle and identifying a difference in a first version of the common vehicle application installed in the remote connected vehicle and a second version of the common vehicle application installed in the ego vehicle; forming a vehicular micro cloud including the ego vehicle and the remote connected vehicle responsive to the difference being identified; determining, by a processor of the ego vehicle, a maximum possible functionality of the common vehicle application; determining a set of tasks to be completed to achieve the maximum possible functionality; assigning a first subset of the set of tasks to the ego vehicle and a second subset of the set of tasks to the remote connected vehicle, where collectively the first subset and the second subset include each of the tasks in the set of tasks; and using the vehicular micro cloud to cause the ego vehicle to complete the first subset and the remote connected vehicle to complete the second subset so that the maximum possible functionality of the common application is achieved. Other embodiments of this aspect include corresponding computer systems, apparatus, and computer programs recorded on one or more computer storage devices, each configured to perform the actions of the methods.

Implementations may include one or more of the following features. The method where the common vehicle application includes a vehicle control system. The common vehicle application includes an autonomous driving system. The common vehicle application includes an advanced driver assistance system. The maximum possible functionality includes the functionality of a most recently released version of the common vehicle application. The maximum possible functionality includes less functionality than a most recently released version of the common vehicle application. The vehicular micro cloud provides functionality that benefits each member of the vehicular micro cloud. The V2X data includes remote application data that describes a first set of applications installed in the remote connected vehicle and first version information for the first set of applications, where ego application data describes a second set of applications installed in the ego vehicle and second version information for the second set of applications. The common vehicle application is determined based on comparison of the remote application data and the ego application data. The V2X data includes resource data describing, among other things, a first hardware capability of the remote vehicle. The maximum possible functionality of the common vehicle application is determined by the processor of the ego vehicle based on one or more of: the first hardware capability of the remote vehicle; a second hardware capability of the ego vehicle; the first version information; and the second version information. The vehicular micro cloud includes each member of the vehicular micro cloud sharing their unused computing resources with one another to complete the set of tasks for a benefit of each member of the vehicular micro cloud. Implementations of the described techniques may include hardware, a method or process, or computer software on a computer-accessible medium.

One general aspect includes a system of an ego vehicle. The system also includes a communication unit; a non-transitory memory; and a processor communicatively coupled to the communication unit and the non-transitory memory, where the non-transitory memory stores computer readable code that is operable, when executed by the processor, to cause the processor to execute steps including: determining a common vehicle application that is installed in both a remote connected vehicle and an ego vehicle and identifying a difference in a first version of the common vehicle application installed in the remote connected vehicle and a second version of the common vehicle application installed in the ego vehicle; forming a vehicular micro cloud including the ego vehicle and the remote connected vehicle responsive to the difference being identified; determining, by a processor of the ego vehicle, a maximum possible functionality of the common vehicle application; determining a set of tasks to be completed to achieve the maximum possible functionality; assigning a first subset of the set of tasks to the ego vehicle and a second subset of the set of tasks to the remote connected vehicle, where collectively the first subset and the second subset include each of the tasks in the set of tasks; and causing the ego vehicle to complete the first subset and the remote connected vehicle to complete the second subset so that the maximum possible functionality of the common application is achieved. Other embodiments of this aspect include corresponding computer systems, apparatus, and computer programs recorded on one or more computer storage devices, each configured to perform the actions of the methods.

Implementations may include one or more of the following features. The system may include parsing V2X data from a wireless message received from the ego vehicle, where the V2X data includes remote application data that describes a first set of applications installed in the remote connected vehicle and first version information for the first set of applications, where ego application data describes a second set of applications installed in the ego vehicle and second version information for the second set of applications. The common vehicle application is determined based on comparison of the remote application data and the ego application data. The V2X data includes resource data describing, among other things, a first hardware capability of the remote vehicle. The maximum possible functionality of the common vehicle application is determined by the processor of the ego vehicle based on one or more of: the first hardware capability of the remote vehicle; a second hardware capability of the ego vehicle; the first version information; and the second version information. Implementations of the described techniques may include hardware, a method or process, or computer software on a computer-accessible medium.

One general aspect includes a computer program product of an ego vehicle including computer code stored on a non-transitory memory that is operable, when executed by an onboard vehicle computer of the ego vehicle, to cause the onboard vehicle computer to execute operations including: determine a common vehicle application that is installed in both a remote connected vehicle and an ego vehicle and identifying a difference in a first version of the common vehicle application installed in the remote connected vehicle and a second version of the common vehicle application installed in the ego vehicle; form a vehicular micro cloud including the ego vehicle and the remote connected vehicle responsive to the difference being identified; determine a maximum possible functionality of the common vehicle application; determine a set of tasks to be completed to achieve the maximum possible functionality; assign a first subset of the set of tasks to the ego vehicle and a second subset of the set of tasks to the remote connected vehicle, where collectively the first subset and the second subset include each of the tasks in the set of tasks; and cause the ego vehicle to complete the first subset and the remote connected vehicle to complete the second subset so that the maximum possible functionality of the common application is achieved. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Described herein are embodiments of a resolver system. The functionality of the resolver system is now introduced according to some embodiments. Vehicles include onboard sensors that constantly record sensor data describing their external environment. Vehicles transmit V2X messages to one another. The sensor data includes digital data describing the sensor measurements recorded by the onboard sensors (e.g., the sensor set). These V2X messages include V2X data in their payload. The V2X data includes the sensor data they record. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

Figure 1:
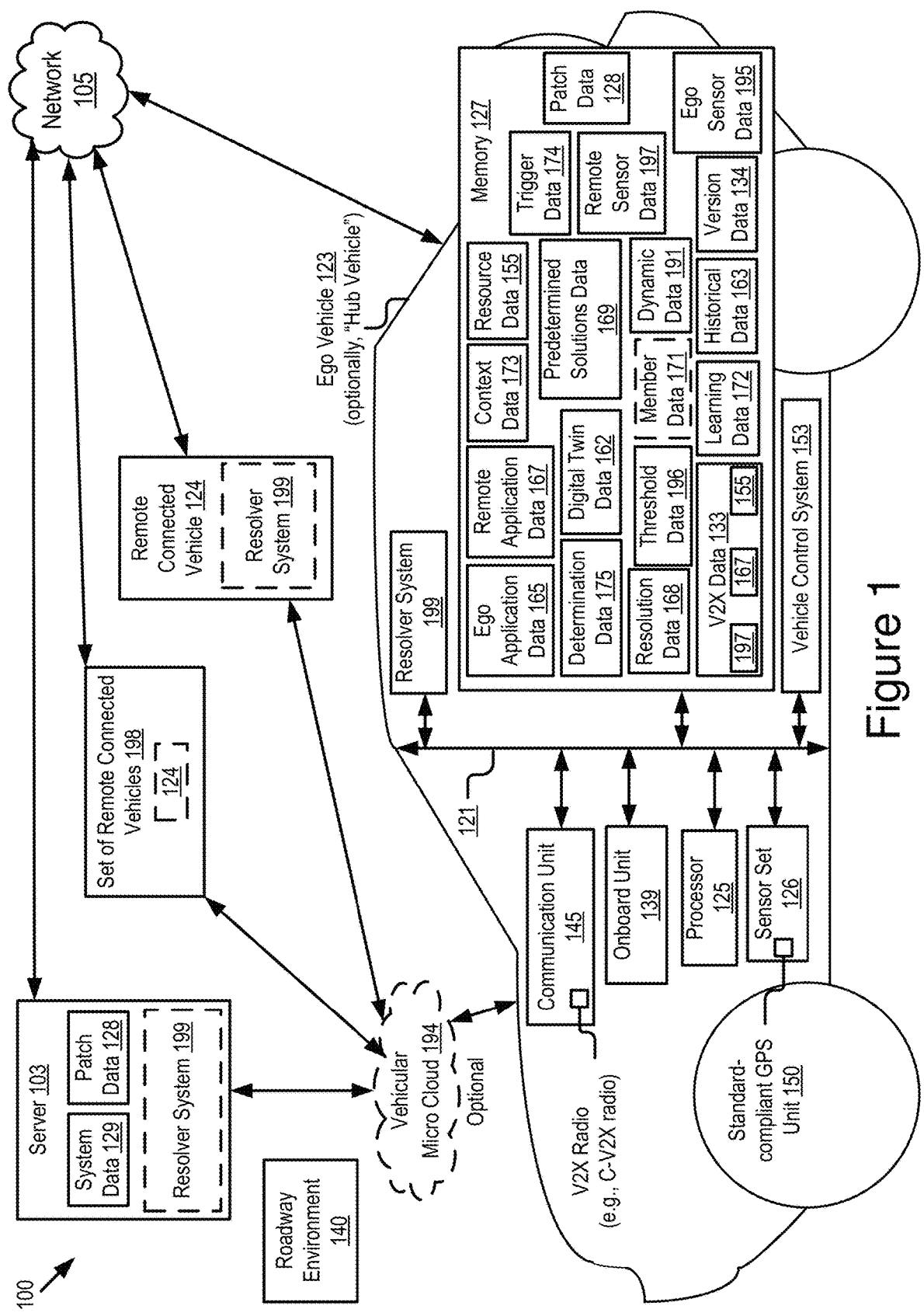
FIG. 1 is a block diagram illustrating an operating environment for a resolver system according to some embodiments.

An example of the V2X data according to some embodiments includes the V2X data 133 depicted in FIG. 1. An example of the sensor data according to some embodiments includes the remote sensor data 197 depicted in FIG. 1.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIG. 1. Vehicle control systems are examples of a vehicle application as described herein.

Figure 4:
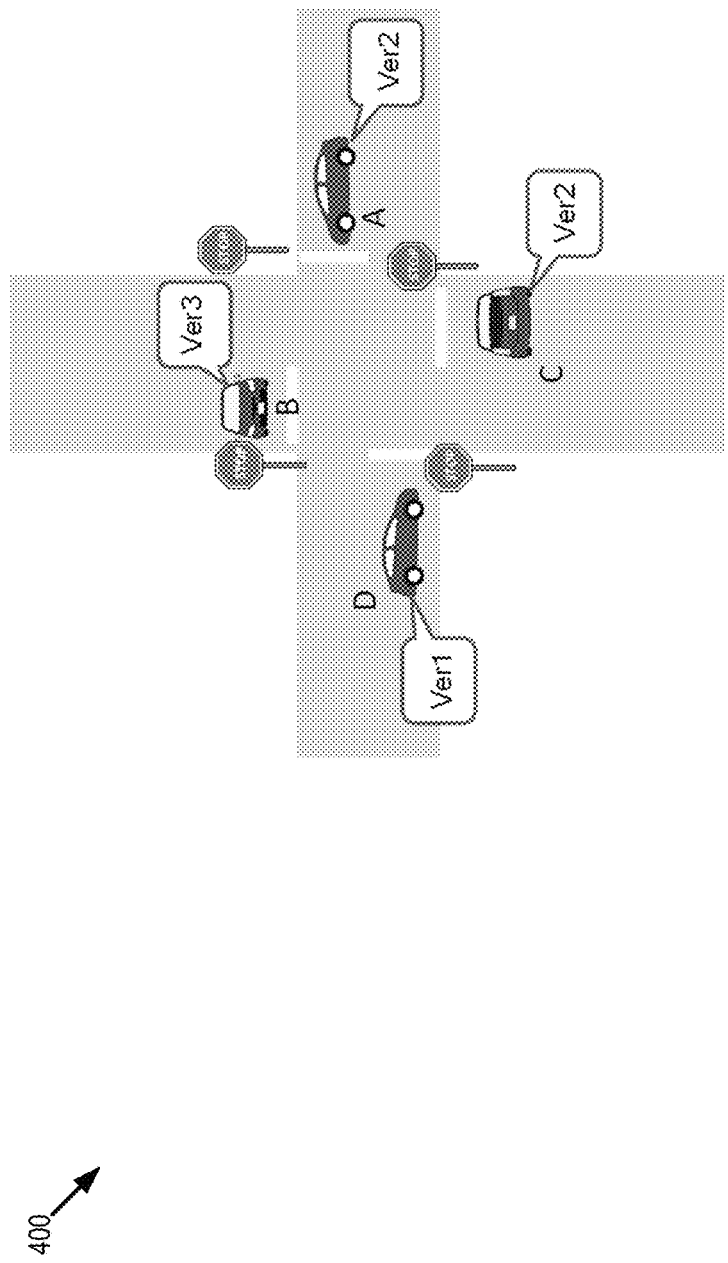
FIG. 4 is a block diagram of an example use case of the resolver system according to some embodiments.
Figure 5:
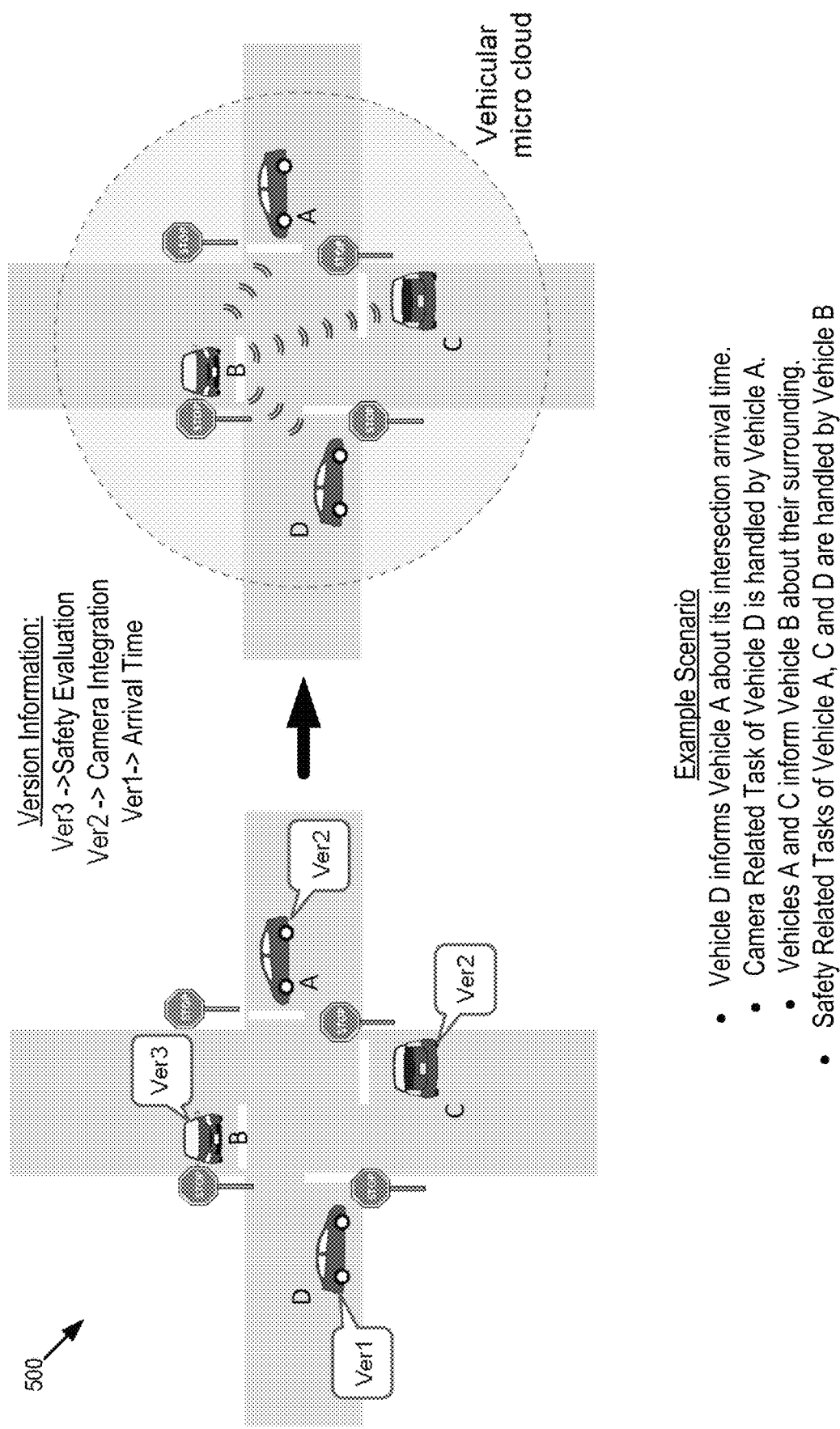
FIG. 5 is a block diagram of an example use case of the resolver system including a vehicular micro cloud according to some embodiments.

An intersection management system, as described below with reference to FIGS. 4 and 5, is an example of a vehicle control system. The functionality of the resolver system is not limited to intersection management systems. The example provided in FIGS. 4 and 5 is intended to be illustrative and not limiting of the functionality of the resolver system to resolve vehicle application version differences for connected vehicles.

Example General Method

In some embodiments, the resolver system includes code and routines that are operable, when executed by a processor, to cause the processor to execute one or more steps of an example general method. The resolver system may be an element of an ego vehicle or a roadway device such as a roadside unit (RSU). As described, the resolver system is an element of an ego vehicle, but this description is not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 1. The remote connected vehicle is also a connected vehicle, and so, it includes a communication unit.

An example of the example general method is now described. In some embodiments, one or more steps of the example general method are skipped. The steps of the example general method may be executed in any order, and not necessarily the order presented. The steps of the example general method are now described according to some embodiments.

Step 1: Identify, by a processor of the ego vehicle, the vehicle applications installed in the ego application. Build a list or some other data structure that describes these vehicle applications. Store the data structure in the memory of the ego vehicle.

This step is also executed by the resolver system(s) of one or more remote vehicles that include their own instances of the resolver system stored therein. In this way, the resolver system(s) of these one or more remote vehicles also generate a list or some other data structure that describes which vehicle applications they store.

Step 2: Analyze the list of vehicle applications to determine version information for these vehicle applications. Version information includes a description of which version of the vehicle application is installed in the ego vehicle (or remote vehicle when this step is executed by a remote vehicle). For example, a vehicle application includes one or more bits of data included in the code and routines of the vehicle application that describes version information for the vehicle application. The resolver system parses the code and routines of the vehicle application to identify the version information included in the code and routines of the vehicle application. In some embodiments, the version information is stored in a list or data structure by the resolver system. This list or data structure is either the same or different as the one generated in step 1.

This step is also executed by the resolver system(s) of one or more remote vehicles that include their own instances of the resolver system stored therein. In this way, the resolver system(s) of these one or more remote vehicles also generate a list or some other data structure that describes the version information for the vehicle applications they store.

Step 3: Build digital data that describes the vehicle applications stored by the ego vehicle and the version information for these vehicle applications. For example, the resolver system analyzes the lists or data structure(s) outputted by steps 1 and 2 and generates digital data that describes the vehicle applications stored by the ego vehicle and the version information for these vehicle applications based on the information described by these lists or data structure(s).

Ego application data includes digital data that describes the vehicle applications installed in the ego vehicle and the versions of these vehicle applications. In some embodiments, the ego application data includes the data structure. An example of the ego application data according to some embodiments includes the ego application data 165 depicted in FIG. 1.

Accordingly, the output of this step when executed by the resolver system of an ego vehicle is ego application data describing the vehicle applications stored by the ego vehicle.

This step is also executed by the resolver system(s) of one or more remote vehicles that include their own instances of the resolver system stored therein. In this way, the resolver system(s) of these one or more remote vehicles also generate digital data that scribes the vehicle applications stored by these one or more remote vehicle and the version information for these vehicle applications.

Remote application data includes digital data that describes the vehicle applications installed in the remote vehicle and the versions of these vehicle applications. In some embodiments, the remote application data includes the data structure. An example of the remote application data according to some embodiments includes the remote application data 167 depicted in FIG. 1.

Accordingly, the output of this step when executed by the resolver system of a remote vehicle is remote application data describing the vehicle applications stored by the remote vehicle.

Step 4: Build a V2X message that includes as its payload digital data that describes, among other things, the vehicle applications stored by the ego vehicle and the version information for these vehicle applications. An example of a suitable V2X message includes a BSM as described in the DSRC protocols. However, other V2X messages which are transmitted regularly are also acceptable so long as their protocols permit V2X data in their payloads as described herein.

In some embodiments, this step is executed by both the ego vehicle and one or more remote connected vehicles, as is described below. When this step is executed by the remote vehicle, the V2X data includes one or more of the following: remote sensor data; remote application data; and resource data. Accordingly, the remote connected vehicle transmits a V2X message including V2X data having one or more of remote sensor data, remote application data, and resource data included therein. When this step is executed by the ego vehicle, the V2X data includes one or more of the following: ego sensor data; ego application data; and resource data. Accordingly, the ego vehicle transmits a V2X message including V2X data having one or more of ego sensor data, ego application data, and resource data included therein. An example of the V2X data according to some embodiments includes the V2X data 133 depicted in FIG. 1. As depicted in FIG. 1, the V2X data 133 includes remote sensor data 197, remote application data 167, and resource data 155. Accordingly, the example of V2X data 133 depicted in FIG. 1 is an example of V2X data 133 constructed by a resolver system 199 of a remote connected vehicle 124 and transmitted by the communication unit 145 of the remote connected vehicle 124, which is subsequently received by the communication unit 145 of ego vehicle 123, parsed by the resolver system 199 of the ego vehicle 123 to retrieve the V2X data 133 which is stored in the memory 127 of the ego vehicle 123 by the resolver system 199 of the ego vehicle 123.

The ego vehicle is a connected vehicle that includes an onboard sensor set. An example of the sensor set in some embodiments includes the sensor set 126 depicted in FIG. 1. The resolver system of the ego vehicle causes the sensor set to record sensor measurements of the roadway environment.

The ego sensor data includes digital data that describes the sensor measurements of the sensor set of the ego vehicle. The ego sensor data is included in the V2X data of the V2X message that is built by the resolver system of the ego vehicle. The V2X data built by the resolver system of the ego vehicle includes any digital data included in the payload of the V2X data, including the ego sensor data. An example of the ego sensor data according to some embodiments includes the ego sensor data 195 depicted in FIG. 1. The ego sensor data is digital data that describes, among other things, the sensor measurements that describe a roadway environment which are recorded by the sensor set of the ego vehicle.

The roadway environment is a portion of the real-world that includes tangible objects. These tangible objects include the ego vehicle. In some embodiments, the tangible objects include one or more remote connected vehicles. Accordingly, the ego sensor data includes digital data that describes sensor measurements which themselves describe the portion of the real-world that includes the ego vehicle limited by the sensor range of the sensors included in the sensor set of the ego vehicle.

The resolver system of the ego vehicle builds V2X data for inclusion in the V2X message transmitted by the communication unit of the ego vehicle. This V2X data includes one or more of the ego sensor data 195, the ego application data 165, and the resource data 155 for the ego vehicle. In some embodiments, the V2X message is a BSM and the ego application data 165 and the resource data 155 are included in Part 2 of the BSM as described in the DSRC protocols. The ego sensor data 195 and the ego application data 165 are described herein. The member data 171 for the ego vehicle describes, among other things, the computing resources of the ego vehicle.

For example, the resource data 155 includes digital data that describes, among other things, one or more of the following: what computing hardware is present in the ego vehicle (e.g., the onboard unit, processor, sensor set, communication unit, memory, and actuators used by the vehicle control systems, among others); what communication bandwidth is available to the ego vehicle (e.g., bandwidth to the network 105); and what cloud computing services are accessible to the ego vehicle (e.g., what cloud serves the ego vehicle has access to, what computing services these serves provide, and the latency associated with accessing these computing services).

In some embodiments, the resource data 155 is an element of the member data after a vehicular micro cloud is formed. The member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 1. In some embodiments, the resolver system 199 cause the communication unit to transmit a wireless message to candidates for membership in the vehicular micro cloud that causes these candidates to join the vehicular micro cloud. The list of candidates is determined by the resolver system based on the resource data 155 which is transmitted by the candidates in earlier steps of this method.

The remote connected vehicle is a connected vehicle that includes an onboard sensor set. The sensor set included in the remote connected vehicle is similar to the one included in the ego vehicle. The resolver system of the remote connected vehicle causes the sensor set to record sensor measurements of the roadway environment.

The remote sensor data includes digital data that describes the sensor measurements of the onboard sensor set of the remote connected vehicle. The remote sensor data is included in the V2X data of the first V2X message. The V2X data built by the resolver system of the remote connected vehicle includes any digital data included in the payload of the V2X data, including the remote sensor data. An example of this V2X data according to some embodiments includes the V2X data 133 depicted in FIG. 1. An example of the remote sensor data according to some embodiments includes the remote sensor data 197 depicted in FIG. 1. The remote sensor data is digital data that describes, among other things, the sensor measurements that describe a roadway environment which are recorded by the sensor set of the remote connected vehicle.

The resolver system of the remote connected vehicle builds V2X data for inclusion in the V2X message transmitted by the communication unit of the remote connected vehicle. This V2X data includes one or more of the remote sensor data 197, the remote application data 167, and the resource data 155 for the remote connected vehicle. The remote sensor data 197 and the remote application data 167 are described herein.

The resource data 155 for the remote connected vehicle includes digital data that describes, among other things, the computing resources of the remote connected vehicle. For example, the resource data 155 of the remote connected vehicle describes, among other things, one or more of the following: what computing hardware is present in the remote connected vehicle (e.g., the onboard unit, processor, sensor set, communication unit, memory, and actuators used by the vehicle control systems, among others); what communication bandwidth is available to the remote connected vehicle (e.g., bandwidth to the network 105); and what cloud computing services are accessible to the remote connected vehicle (e.g., what cloud serves the ego vehicle has access to, what computing services these serves provide, and the latency associated with accessing these computing services).

As used herein, the term "wireless message" refers to a V2X message transmitted by a communication unit of a connected vehicle such as a remote connected vehicle or the ego vehicle.

Step 5: Transmit the V2X message. In some embodiments, this transmission is a broadcast. In some embodiments, this transmission is a unicast. In some embodiments, this transmission is multicast and targets only the members of a vehicular micro cloud. The V2X message includes the V2X data as its payload. In some embodiments, this step is executed by both the ego vehicle and one or more remote connected vehicles, as is described below.

Step 6: Receive a set of V2X messages transmitted by other vehicles. For example, the communication unit of an ego vehicle receives a set of V2X messages from one or more remote connected vehicles.

This step is now described from the perspective of the ego vehicle after receiving a set of V2X messages that were transmitted by one or more remote connected vehicles at step 5. However, the resolver system(s) of one or more remote connected vehicles also execute this step in some embodiments upon receipt of V2X messages from the ego vehicle and one or more other remote connected vehicles.

The remaining steps of the example general method are generally described from the perspective of the ego vehicle. However, the resolver system(s) of one or more remote connected vehicles also execute similar steps in some embodiments to provide the functionality of the resolver system in cooperation with the resolver system of the ego vehicle.

Step 7: Parse the V2X data from the set of V2X messages received from the one or more remote connected vehicles.

Step 8: Build a data structure including the remote application data and the resource data received from the one or more remote connected vehicles. The remote application data and the resource data are organized so that the data structure is searchable, or otherwise analyzable by the resolver system, to determine which instances of remote application data and which instances of resource data were sent by which remote connected vehicles. For example, if an instance of remote application data and an instance of resource data is sent by the same remote connected vehicle, then the data structure is organized so that the resolver system of the ego system can analyze the data structure and identify this correspondence between this instances of remote application data and this instance of resource data. This is true of each instance of remote application data and resource data received by the ego vehicle. In this way, the resolver system of the ego vehicle has access to digital data that describes, for each remote connected vehicle that transmits a V2X message which is received by the ego system, one or more of the following: each vehicle application installed therein; and the computing resources of these remote connected vehicles.

In some embodiments, the data structure also includes the remote sensor data transmitted by these remote connected vehicles and the data structure is searchable, or otherwise analyzable by the resolver system, to determine which instances of remote application data, which instances of resource data, and which instances of remote sensor data were sent by the same the remote connected vehicles.

Step 9: Analyze the data structure built in step 8 to identify version differences in a vehicle application that is installed in at least one remote connected vehicle and the ego vehicle; this vehicle application is referred to herein as a "common vehicle application." Accordingly, a common vehicle application is identified by the resolver system when there is an is an instance of a same vehicle application (1) which is installed in both an ego vehicle and at least one remote connected vehicle and (2) there is a difference in the version installed in the ego vehicle and the version(s) installed in the one or more remote connected vehicles. A common vehicle application is not present if there are not also version differences among the ego vehicle and the at least one remote connected vehicles.

Step 10: Send and receive wireless messages with the vehicles that transmitted V2X messages to the ego vehicle as described above. The digital data included in these wireless messages include instructions for causing a vehicular micro cloud to be formed. Accordingly, the vehicular micro cloud is formed responsive to the identification of the version difference in the common vehicle application. The identification of the version difference in step 9 triggers the formation of the vehicular micro cloud by the resolver system of the ego vehicle. In some embodiments, the members are the ego vehicle and the remote connected vehicles that transmitted a V2X message that is received by the ego vehicle as described above.

In some embodiments, the resolver system only forms a vehicular micro cloud if the ego vehicle is in a driving context within the roadway environment that is affected by the common vehicle application that is identified at step 10.

Ego sensor data describes the sensor measurements of the current driving context for the ego vehicle in the roadway environment. Context data includes digital data that describes examples of known contexts. For example, the context data describes object priors or other examples of conditions in a roadway which are known to be associated with particular driving contexts. In some embodiments, the resolver system 199 compares the ego sensor data (and/or the remote sensor data) to the context data to determine the current driving context of the ego vehicle. The context data may be predetermined and installed in the ego vehicle at the time of manufacture, generated over time using learning algorithms included in the resolver system, crowd sourced from a plurality of vehicles (e.g., using vehicular micro clouds, cloud servers, edge serves installed in roadside units, etc.) or any other source for aggregating knowledge about driving contexts which are possible in the roadway environment. In this way the resolver system uses sensor measurements to determine the current driving context of the ego vehicle according to some embodiments. An example of the context data according to some embodiments includes the context data 173 depicted in FIG. 1.

Trigger data describes, for vehicular applications that are available to be installed in vehicles such as the ego vehicle and the remote connected vehicle, which driving contexts are implicated (e.g., for specific vehicular applications, which specific driving contexts would be affected). For example, if a vehicle application is an ADAS system for managing exiting an on-ramp for a highway, then the trigger data describes that the driving context which is affected by the vehicle application is the ego vehicle being present on an on-ramp of a highway. This driving context being present is referred to herein as the "trigger" for forming the vehicular micro cloud. An example of the trigger data according to some embodiments includes the trigger data 174 depicted in FIG. 1.

Accordingly, in some embodiments the resolver system analyzes the trigger data for a common vehicle application, determines which driving contexts are affected by the presence of the common vehicle application, analyzes the ego sensor data (and optionally also the remote sensor data) to determine if the ego vehicle is currently present in a driving context which is affected by the presence of the common vehicle application, and forms the vehicular micro cloud if the ego vehicle is present in the driving context which is affected by the presence of the common vehicle application.

In some embodiments, if the ego vehicle is not present in the driving context which is affected by the presence of the common vehicle application then the resolver system continues to analyze new ego sensor data as it is generated to determine whether the "trigger" has occurred, i.e., whether the ego vehicle is now present in the driving context which is affected by the presence of the common vehicle application; if this "trigger" occurs, then the resolver system forms the vehicular micro cloud.

Step 11: Determine which of the vehicles from among the ego vehicle and the at least one remote connected vehicle has the highest version or most recent version of the common vehicle application [or the most feature rich version of the common vehicle application]. Version data includes digital data that describes: (1) the vehicle applications which are available for installation in vehicles such as the ego vehicle and the remote connected vehicles; (2) the versions that are released for each of these vehicle applications; (3) the functionality provided by each of these versions; and (4) the differences in the functionality provided by each of these versions. An example of the version data according to some embodiments includes the version data 134 depicted in FIG. 1.

In some embodiments, the resolver system of the ego vehicle determines which of the vehicles from among the ego vehicle and the at least one remote connected vehicle has the highest version or most recent version of the common vehicle application [or the most feature rich version of the common vehicle application] based on the version data, the ego application data, and the remote application data for the at least one remote connected vehicles.

Step 12: Determine the functional differences in the version of the common vehicle application installed in the ego vehicle and the at least one remote connected vehicle. For example, the resolver system of the ego vehicle determines the difference in functionality provided by (1) most recent version of the common vehicle application and (2) the older version(s) of the common vehicle application. The difference in functionality is described herein as a "delta," referring to a difference between two things.

In some embodiments, the resolver system of the ego vehicle determines the functional differences in the version of the common vehicle application installed in the ego vehicle and the at least one remote connected vehicle based on based on the version data, the ego application data, and the remote application data for the at least one remote connected vehicles.

In some embodiments, the example general method includes determining if a software patch is available to update the common vehicle application for all vehicles to the most recent version of the common vehicle application and whether enough time is available to download and install this software patch. Enough time is available if a threshold for latency is satisfied by a predicted time to download and install the software patch. If a software patch is available, and the threshold is satisfied, then the software patch is downloaded and installed, and the example general method ends here. If both of these requirements are not met, then the example general method continues as described below. Threshold data includes digital data that describes the threshold as well as any other threshold described herein. An example of the threshold data according to some embodiments includes the threshold data 196 depicted in FIG. 1. Patch data includes digital data that describes the software patch. An example of the patch data includes the patch data 128 depicted in FIG. 1. In some embodiments, the patch data is downloaded from a cloud server. For example, the patch data is downloaded from the server 103 depicted in FIG. 1.

Step 13: Determine what computing resources are needed to minimize the functional differences between the most recent version of the common vehicle application and the older version(s) of the common vehicle application. In some embodiments the version data describes, for each type of functionality included in a vehicle application that is described by the version data, what computer resources are used to provide each different type of functionality. The resolver system analyzes this aspect of the version data to determine what computing resources are needed to provide functionality that achieves the effect of minimizing the functional differences between the most recent version of the common vehicle application and the older version(s) of the common vehicle application.

In some embodiments, minimizing the functional differences includes, for example, identifying an aided vehicle (e.g., a remote connected vehicle) having an earlier version of a vehicle application, identifying that the earlier version of the vehicle application provides different functionality than the most recent version of the common vehicle application (e.g., the earlier version is missing "function M" which is present in the most recent version), and causing the vehicular micro cloud to provide services to the vehicle so that processor of the aided vehicle executes codes and routines that are equivalent to, or the same as, the execution of the most recent version of the common vehicle application. For example, the processor of the remote connected vehicle (i.e., the aided vehicle) is aided by receiving digital data and/or services (e.g., vehicular micro cloud tasks) from other members of the vehicular micro cloud executes; the processor of the remote connected vehicle uses the digital data or services while executing the common vehicle application in such a way that the missing function M is provided to the remote connected vehicle with the assistance of the members of the vehicular micro cloud that provide data or services to the remote connected vehicle. The digital data includes the outputs of the members of the vehicular micro cloud executing tasks as described below with reference to step 15. In some embodiments, it is actually a processor of a different vehicle that is also a member of the vehicular micro cloud that actually executions the missing function M and provides an output (e.g., digital data or a computational service) to the aided vehicle which results in the aided vehicle receiving an outcome from the execution of its earlier version of the common vehicle application which is equivalent to execution of the most recent version of the common vehicle application. In some embodiments, it is not possible to achieve this equivalency (e.g., due to limitations in computing resources as described below in step 14) and the resolver system uses the vehicular micro cloud to provide the maximum possible functionality to the aided vehicle given the limitations within the vehicular micro cloud. An example of this functionality of the resolver system is described in more detail below with reference to step 15.

As used herein, the term "missing function M" refers to a singular function which is present in the most recent version of a common vehicle application but not present (or present, but different) in an earlier version of the common vehicle application.

The term "missing functionality M" refers to a set of missing functions M. In some embodiments, a missing function M is a function that is present in both the earlier version and the most recent version, but different between these two versions (e.g., because of bug fixes, protocol changes, or other modifications). The missing functionality M is an example of "the functional differences in the version of the common vehicle application installed in the ego vehicle and the at least one remote connected vehicle and the computing resources of the ego vehicle and the at least one remote connected vehicles" as described below with reference to step 15.

Step 14: Analyze the computing resources of the ego vehicle and the at least one remote connected vehicles to determine a maximum possible functionality that is achievable for the execution of the common vehicle application given the computing resources available within the vehicular micro cloud [e.g., the computing resources that the members of the vehicular micro cloud make available for use by the other members of the vehicular micro cloud].

In some embodiments the version data describes, for each type of functionality included in a vehicle application that is described by the version data, what computer resources are used to provide different types of functionality which is provided by different versions of the vehicle applications which are capable of installation in vehicles such as the ego vehicle and the remote connected vehicles. The resolver system compares this aspect of the version data in against the computer resources that are available within the vehicular micro cloud as described by the member data (and/or the aggregated resource data) to determine a maximum possible functionality that is achievable for the execution of the common vehicle application given the computing resources available within the vehicular micro cloud [e.g., the computing resources that the members of the vehicular micro cloud make available for use by the other members of the vehicular micro cloud].

For example, the resolver system has previously determined which version of a common vehicle application is installed the at least one remote connected vehicle and the vehicle functionalities of the most recent version of the common vehicle application which are absent in the version which is installed in the at least one remote connected vehicle (e.g., step 13). The version data describes, for each type of functionality included in a vehicle application that is described by the version data, what computer resources are used to provide different types of functionality which is provided by different versions of the vehicle applications which are capable of installation in vehicles such as the ego vehicle and the remote connected vehicles. Accordingly, the resolver system determines, using the output of step 13, what computer resources are needed to provide missing functionality M to an aided vehicle. The resolver system compares this to the computer resources that are available within the vehicular micro cloud as described by the member data (and/or the aggregated resource data) to determine a maximum possible functionality that is achievable for the execution of the common vehicle application given the computing resources available within the vehicular micro cloud. In some embodiments, the maximum possible functionality is the same as, or equivalent to, the missing functionality M. In some embodiments, the maximum possible functionality is less than the missing functionality M, but the most similar functionality that is possible given the computational resources that are available within the vehicular micro cloud.

Resolution data includes digital data that describes the maximum possible functionality is the same as, or equivalent to, the missing functionality M. An example of the resolution data according to some embodiments includes the resolution data 168 depicted in FIG. 1.

Step 15: Determine, based at least in part on one or more of the functional differences in the version of the common vehicle application installed in the ego vehicle and the at least one remote connected vehicle and the computing resources of the ego vehicle and the at least one remote connected vehicles, a set of tasks to be completed in order for the members of the vehicular micro cloud to create an outcome that is equal to or equivalent to the maximum possible functionality that is achievable for the execution of the common vehicle application given the computing resources available within the vehicular micro cloud. This is an example of using a vehicular micro cloud to minimize the functional differences between an aided vehicle (e.g., a remote connected vehicle) having an earlier version of a common vehicle application and an ego vehicle having the most recent version of the common vehicle application.

In some embodiments, minimizing the functional differences includes, for example, executing one or more of the following sub-steps: (1) identifying an aided vehicle (e.g., a remote connected vehicle) having an earlier version of a vehicle application; (2) identifying that the earlier version of the vehicle application provides different functionality than the most recent version of the common vehicle application (e.g., the earlier version is missing "functionality M" which is present in the most recent version); and (3) and causing the vehicular micro cloud to provide services (e.g., the set of tasks) to the aided vehicle so that processor of the aided vehicle executes codes and routines that are equivalent to, or the same as, the execution of the most recent version of the common vehicle application.

For example, the processor of the remote connected vehicle (i.e., the aided vehicle) is aided by receiving digital data and/or services (e.g., vehicular micro cloud tasks) from other members of the vehicular micro cloud executes; the processor of the remote connected vehicle uses the digital data or services while executing the common vehicle application in such a way that the missing function M is provided to the remote connected vehicle with the assistance of the members of the vehicular micro cloud that provide data or services to the remote connected vehicle. The digital data includes the outputs of the members of the vehicular micro cloud executing tasks as described below with reference to step 15.

In some embodiments, the resolver system executes a digital twin simulations and uses the outcome of these digital twin simulations to determine the set of tasks to be completed in order for the members of the vehicular micro cloud to create an outcome that is equal to or equivalent to the maximum possible functionality that is achievable for the execution of the common vehicle application given the computing resources available within the vehicular micro cloud. For example, the digital twin simulations simulate every calculable scenario for different tasks to be completed and compares the outcome of these scenarios to the missing functionality to identify the maximum possible maximum possible functionality that is achievable for the execution of the common vehicle application given the computing resources available within the vehicular micro cloud. Based on this analysis, the resolver system determines the set of tasks to be completed in order for the members of the vehicular micro cloud to create an outcome that is equal to or equivalent to the maximum possible functionality that is achievable for the execution of the common vehicle application given the computing resources available within the vehicular micro cloud. In some embodiments, these digital twin simulations are also used to determine which of the members of the vehicular micro cloud execute the different tasks (see, e.g., step 16 below). Digital twin data includes digital data that describes all the information necessary to execute the digital twin simulations as well as the output of executing the digital twin simulations (e.g., the determination data which is described below). Digital twin simulations are described in more detail below.

In some embodiments, the resolver system 199 includes any simulation software, game engines or other code and routines that are necessary to execute the digital twin simulations. In some embodiments, the resolver system 199 determines the resolution data 168 using the digital twin simulations.

Determination data includes digital data that describes (1) the set of tasks to be completed in order for the members of the vehicular micro cloud to create an outcome that is equal to or equivalent to the maximum possible functionality that is achievable for the execution of the common vehicle application given the computing resources available within the vehicular micro cloud; and (2) which tasks should be assigned to which members of the vehicular micro cloud and a timing for the completion of each task. In other words, the determination data describes the output of steps 15 and 16. An example of the determination data according to some embodiments includes the determination data 175 depicted in FIG. 1.

In some embodiments, the resolver system provides its functionality over a period of time and builds a data set that describes determination data and resolution data for different combinations of the digital data described herein (e.g., different combinations of common scenarios (e.g., different combinations of ego application data, remote application data, ego sensor data, remote sensor data, context data, resource data, etc.); historical data includes digital data that describes this data set. In some embodiments, the historical data is organized by the resolver system as a data structure or database. In some embodiments, the historical data is organized by the resolver system so that it is searchable. For example, the historical data is queried by the resolver system using different combinations of digital data the historical data outputs one or more of the determination data and the resolution data responsive to this query. In some embodiments, the resolver system generates the determination data and the resolution data described herein using the historical data. An example of the historical data according to some embodiments includes the historical data 163.

In some embodiments, the resolver system includes one or more deep learning algorithms. The resolver system analyzes the historical data and the current digital data for a scenario (e.g., the current combination of e ego application data, remote application data, ego sensor data, remote sensor data, context data, resource data, etc.) and outputs the determination data and resolution data for this current scenario. Examples of deep learning algorithms includes a neural network or any other suitable learning algorithm. Ideally, the learning algorithm is an unsupervised learning algorithm. However, examples are possible where the learning algorithm is a supervised learning algorithm. Learning data includes digital data that describes the inputs to and the outputs of the one or more deep learning algorithms. An example of the learning data according to some embodiments includes the learning data 172 depicted in FIG. 1.

In some embodiments, the different combinations of the digital data that the resolver system is solving for in a given period of time (e.g., different combinations of common scenarios (e.g., different combinations of ego application data, remote application data, ego sensor data, remote sensor data, context data, resource data, etc.) are referred to as dynamic data. An example of the dynamic data includes the dynamic data 191 depicted in FIG. 1.

As described above, determination data includes digital data that describes (1) the set of tasks to be completed in order for the members of the vehicular micro cloud to create an outcome that is equal to or equivalent to the maximum possible functionality that is achievable for the execution of the common vehicle application given the computing resources available within the vehicular micro cloud; and (2) which tasks should be assigned to which members of the vehicular micro cloud and a timing for the completion of each task. In some embodiments, the set of tasks to be completed in order for the members of the vehicular micro cloud to create an outcome that is equal to or equivalent to the maximum possible functionality is predetermined. Predetermined solutions data includes digital data that describes, for all possible combinations of different versions of an application, the set of tasks to be completed in order for the members of the vehicular micro cloud to create an outcome that is equal to or equivalent to the maximum possible functionality. In some embodiments, the memory of the vehicle stores an instance of predetermined solutions data for each vehicle application stored in the ego vehicle so that predetermined solutions are available for each type of vehicle application that it executes while operating. This predetermined solutions data is an input to the resolver system to make the determination of the determination data easier and less time consuming. In other words, the predetermined solutions data decreases latency associated with execution of the resolver system. An example of the predetermined solutions data includes the predetermined solutions data 169 depicted in FIG. 1.

Step 16: Determine, based at least in part on the computing resources of the members of the vehicular micro cloud, which tasks should be assigned to which members of the vehicular micro cloud and a timing for the completion of each task. As described above, in some embodiments this step is executed by the resolver system using digital twin simulations.

In some embodiments, digital twin simulations are not used by the resolver system to execute this step. Instead, the resolver system considers one or more of the following factors: the computing resources of the individual members; the complexity of each task; which members have the computing resources to complete each task; and the latency involved which different members completing each task. Based on these factors, as well as potentially others, the resolver system assigns different tasks from the set of tasks to one or more of the members. In some embodiments, more than one member of the vehicular micro cloud collaborate together to complete a single task.

Step 17: Build a V2X message for each member including digital data describing the task(s) assigned to them and/or the other members of the vehicular micro cloud [this may include information informing a member that they do not need to execute a task] and the timing for the completion of this task or these tasks. In some embodiments, the V2X message is a C-V2X message.

Step 18: Cause the members of the vehicular micro cloud to complete their assigned task so that the maximum possible functionality of the vehicular micro cloud is achieved. In some embodiments, the V2X message of step 17 includes digital data that describes a timing for when each task should be completed or an event that must occur before a task is completed. In this way the resolver system coordinates the completion of the tasks to achieve the desired result. For example, the desired result is the completion of the maximum possible functionality.

In some embodiments, the maximum possible functionality is the same or equivalent to the functionality of the most recent version of the common vehicle application or the version of the common vehicle application having the most functionality. In some embodiments, the maximum possible functionality is less than the functionality of the most recent version of the common vehicle application or the version of the common vehicle application having the most functionality. The maximum possible functionality is always more functionality or more error-free functionality than oldest version of the vehicle application that is present within the members of the vehicle micro cloud Accordingly, the resolver system includes code and routines that are operable, when executed by a processor, to execute one or more of the following steps: (1) identify version differences in a vehicle application that is installed in at least one remote connected vehicle and the ego vehicle (a "common vehicle application"); (2) trigger the formation of a vehicular micro cloud responsive to the identification of the version difference in the common vehicle application [e.g., the members are the ego vehicle and the remote connected vehicles that transmitted a V2X message that is received by the ego vehicle as described above]; (3) determine which of the vehicles from among the ego vehicle and the at least one remote connected vehicle has the highest version or most recent version of the common vehicle application [or the most feature rich version of the common vehicle application]; (4) determine the functional differences in the version of the common vehicle application installed in the ego vehicle and the at least one remote connected vehicle [e.g., determine the delta between the most recent version of the common vehicle application and the older version(s) of the common vehicle application]; (5) determine what computing resources are needed to minimize the functional differences between the most recent version of the common vehicle application and the older version(s) of the common vehicle application; (6) analyze the computing resources of the ego vehicle and the at least one remote connected vehicles to determine a maximum possible functionality that is achievable for the execution of the common vehicle application given the computing resources available within the vehicular micro cloud [e.g., the computing resources that the members of the vehicular micro cloud make available for use by the other members of the vehicular micro cloud]; (7) determine, based at least in part on one or more of the functional differences in the version of the common vehicle application installed in the ego vehicle and the at least one remote connected vehicle and the computing resources of the ego vehicle and the at least one remote connected vehicles, a set of tasks to be completed in order for the members of the vehicular micro cloud to create an outcome that is equal to or equivalent to the maximum possible functionality that is achievable for the execution of the common vehicle application given the computing resources available within the vehicular micro cloud; (8) determine, based at least in part on the computing resources of the members of the vehicular micro cloud, which tasks should be assigned to which members of the vehicular micro cloud and a timing for the completion of each task; (9) build a V2X message for each member including digital data describing the task(s) assigned to them and/or the other members of the vehicular micro cloud [this may include information informing a member that they do not need to execute a task] and the timing for the completion of this task or these tasks; and (10) cause the members of the vehicular micro cloud to complete their assigned task so that the maximum possible functionality of the vehicular micro cloud is achieved.

Vehicular Micro Clouds

Vehicular micro clouds are an optional feature of some of the embodiments described herein. Some of the embodiments described herein include vehicular micro clouds. For example, some or all of the ego vehicle, the remote connected vehicle, and the recipient vehicle are members of a vehicular micro cloud. Some of the embodiments described herein do not include vehicular micro cloud.

In some embodiments, a vehicular micro cloud includes as a group of connected vehicles where vehicles perform task(s) cooperatively/collaboratively. Vehicular micro clouds can be divided into two categories based on their mobility: (1) stationary; and (2) mobile.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

Vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task.

A vehicular micro cloud includes a group of connected vehicles that communicate with one another via V2X messages to provide a location data correction service.

The vehicular micro cloud includes multiple members. A member of the vehicular micro cloud includes a connected vehicle that sends and receives V2X messages via the serverless ad-hoc vehicular network. In some embodiments, the members of the serverless ad-hoc vehicular network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set. An operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but receives a benefit of a location data correction service for location data that is provided by the members of the serverless ad-hoc vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hoc vehicular network. In this way, the serverless ad-hoc vehicular network is operable to improve the operation of the legacy vehicle, which in turn increases the safety of the sensor rich vehicles that are traveling in a vicinity of the legacy vehicle.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "micro-vehicular cloud" can be replaced by the term "vehicular micro cloud" since a micro-vehicular cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. In some embodiments, a vehicular micro cloud is an example of a micro-vehicular cloud. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes any computational, data storage, or data communication task collaboratively performed by a plurality of the members of a vehicular micro cloud. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

In some embodiments, the functionality provided by the resolver system is a task provided by the vehicular micro cloud. For example, the resolver system is an element of a hub of a vehicular micro cloud. The resolver system receives a set of wireless messages and this triggers the resolver system to form a vehicular micro cloud. The resolver system processes V2X data for the benefit of one or more members of the vehicular micro cloud. For example, the ego vehicle includes computational power that exceeds that of another member, and the ego vehicle processes wireless messages for this member which would otherwise be unable to do so, or unable to do so in a timeframe that satisfies a threshold for latency. Hub vehicles are described in more detail below.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote connected vehicle depicted in FIG. 1 are connected vehicles. A remote unconnected vehicle is not a connected vehicle.

A connected vehicle is a conveyance, such as an automobile, that includes a communication unit that enables the conveyance to send and receive wireless messages via one or more vehicular networks. The embodiments described herein are beneficial for both drivers of human-driven vehicles as well as the autonomous driving systems of autonomous vehicles. For example, the resolver system improves the performance of a vehicle control system, which benefits the performance of the vehicle itself by enabling it to operate more safety or in a manner that is more satisfactory to a human driver of the ego vehicle.

In some embodiments, the resolver system improves the performance of a network because it beneficially takes steps enable the completion of vehicular micro cloud tasks.

In some embodiments, the resolver system improves the performance of a remote connected vehicle because it beneficially provides the remote connected vehicle with the functionality of a most recent version of a particular vehicle application.

In some embodiments, the resolver system is software installed in an onboard unit (e.g., an electronic control unit (ECU)) of a vehicle having V2X communication capability. The vehicle is a connected vehicle and operates in a roadway environment with N number of remote connected vehicles that are also connected vehicles, where N is any positive whole number that is sufficient to satisfy a threshold for forming a vehicular micro cloud. The roadway environment may include one or more of the following example elements: an ego vehicle; N remote connected vehicles; an edge server; and a roadside unit. For the purpose of clarity, the N remote connected vehicles may be referred to herein as the "remote connected vehicle" or the "remote connected vehicles" and this will be understood to describe N remote connected vehicles.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote connected vehicles may be human-driven vehicles, autonomous vehicles, or a combination of human-driven vehicles and autonomous vehicles. In some embodiments, the ego vehicle and the remote connected vehicles may be equipped with DSRC equipment such as a GPS unit that has lane-level accuracy and a DSRC radio that is capable of transmitting DSRC messages.

In some embodiments, the ego vehicle and some or all of the remote connected vehicles include their own instance of a resolver system. For example, in addition to the ego vehicle, some or all of the remote connected vehicles include an onboard unit having an instance of the resolver system installed therein.

In some embodiments, the ego vehicle and one or more of the remote connected vehicles are members of a vehicular micro cloud. In some embodiments, the remote connected vehicles are members of a vehicular micro cloud, but the ego vehicle is not a member of the vehicular micro cloud. In some embodiments, the ego vehicle and some, but not all, of the remote connected vehicles are members of the vehicular micro cloud. In some embodiments, the ego vehicle and some or all of the remote connected vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1. The vehicular micro cloud 194 is depicted in FIG. 1 using a dashed line to indicate that it is an optional feature of the operating environment 100.

Accordingly, in some embodiments multiple instances of the resolver system are installed in a group of connected vehicles. The group of connected vehicles are arranged as a vehicular micro cloud. As described in more detail below, the resolver system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Hub vehicles are an optional feature of the embodiments described herein. Some of the embodiments described herein include a hub vehicle. Some of the embodiments described herein do not include a hub vehicle.

In some embodiments, the resolver system that executes a method as described herein (e.g., the method 300 depicted in FIG. 3 or the general example method described herein, etc.) is an element of a hub or a hub vehicle. For example, the vehicular micro cloud formed by the resolver system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the resolver system determines which member vehicle from a group of vehicles (e.g., the ego vehicle and one or more remote connected vehicles) will serve as the hub vehicle based on a set of factors that indicate which vehicle (e.g., the ego vehicle or one of the remote connected vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the resolver system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the resource data (and/or member data) depicted in FIG. 1 which vehicles such as the ego vehicle 123 and the remote connected vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the resource data which is included in the V2X data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the resolver system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the resolver system. For example, the resolver system is an element of a roadside unit that includes a communication unit 145 but not a server. In another example, the resolver system is an element of another vehicle such as one of the remote connected vehicles 124.

In some embodiments, the operating environment of the resolver system includes servers. Optionally, in these embodiments the resolver system includes code and routines that predict the expected latency of V2X communications involving serves and then time the transmission of these V2X communications so that the latency is minimized or reduced.

In some embodiments, the resolver system is operable to provide its functionality even though the vehicle which includes the resolver system does not have a Wi-Fi antenna as part of its communication unit. By comparison, some of the existing solutions require the use of a Wi-Fi antenna in order to provide their functionality. Because the resolver system does not require a Wi-Fi antenna, it is able to provide its functionality to more vehicles, including older vehicles without Wi-Fi antennas.

In some embodiments, the resolver system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the resolver system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the resolver system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the resolver system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by a resolver system is operable to harness the unused computing resources of many different vehicles to perform complex computational tasks that a single vehicle alone cannot perform due to the computational limitations of a single vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the resolver system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the resolver system, the server is an optional feature of the operating environment. An example of a preferred embodiment of the resolver system does not include the server in the operating environment which includes the resolver system.

In some embodiments, the resolver system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the resolver system requires vehicular micro cloud; this distinction alone differentiates the resolver system from the existing solutions. The resolver system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are re-organized based on monitored task executions results/performance and/or available vehicles and resources. As described herein, the resolver system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2.

A particular vehicle that includes these vehicle control systems is referred to herein as an "ego vehicle" and other vehicles in the vicinity of the ego vehicle as "remote connected vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the resolver system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the resolver system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the resolver system includes software installed in an onboard unit of a connected vehicle. This software is the "resolver system" described herein.

An example operating environment for the embodiments described herein includes an ego vehicle, one or more remote connected vehicles, and a recipient vehicle. The ego vehicle the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having a resolver system stored therein.

Some of the embodiments described herein include a server. However, some of the embodiments described herein do not include a server. An example of a preferred embodiment of the resolver system includes a serverless operating environment. A serverless operating environment is an operating environment which includes at least one resolver system and does not include a server.

Figure 3:
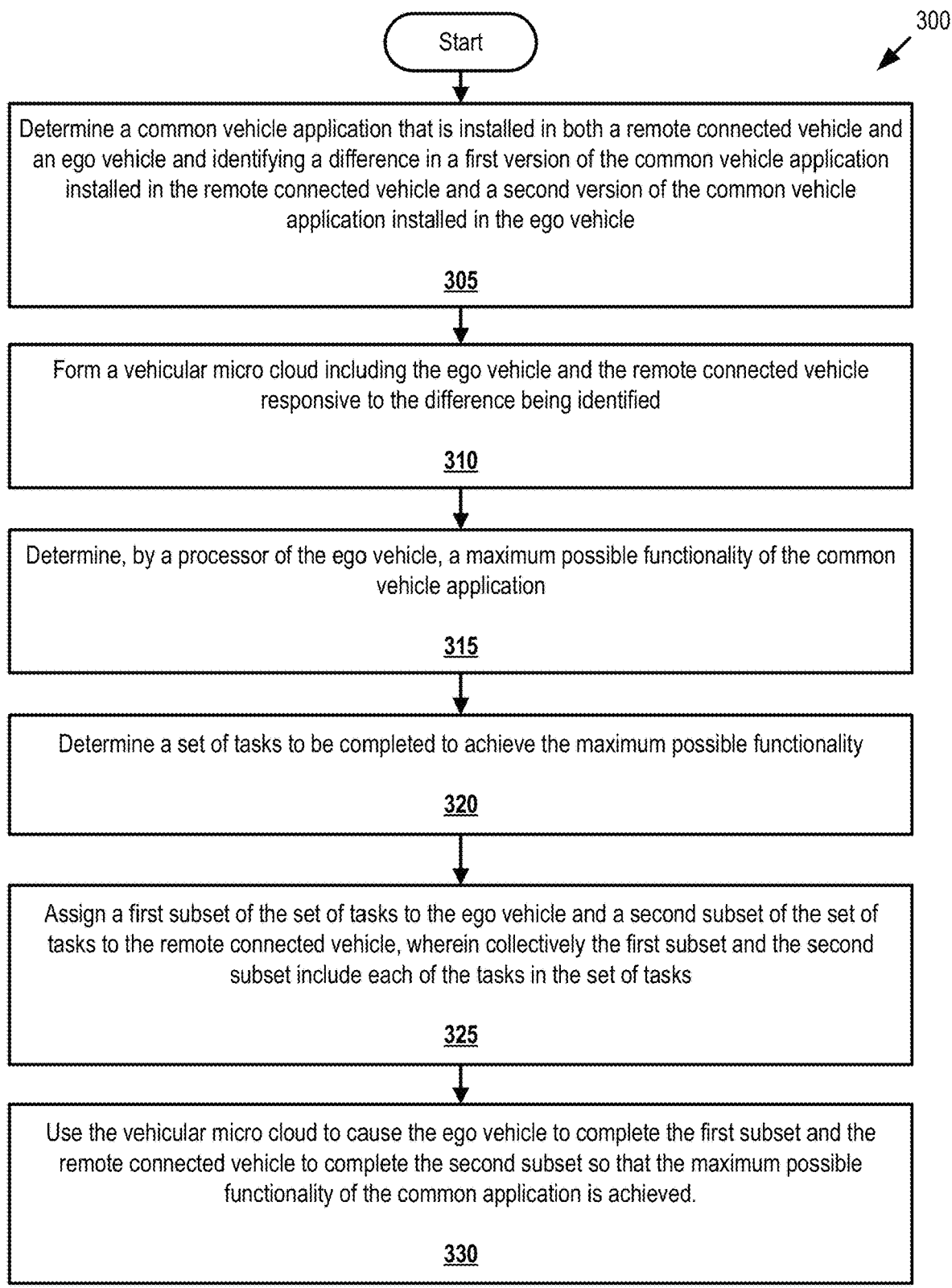
FIG. 3 is a flowchart of an example method for resolving vehicle application version differences according to some embodiments.

In some embodiments, the resolver system includes code and routines that are operable, when executed by a processor of the onboard unit, to cause the processor to execute one or more of the steps of the method 300 depicted in FIG. 3 or any other method described herein (e.g., the example general method).

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S. patent application Ser. No. 16/457,612 filed on Jun. 28, 2019 and entitled "Context System for Providing Cyber Security for Connected Vehicles," the entirety of which is hereby incorporated by reference.

Example Overview

In some embodiments, the resolver system is software that is operable to manage the V2X messages that are transmitted by a vehicle such as the ego vehicle. In some embodiments, the resolver system is stored in an onboard unit of the ego vehicle.

An example operating environment 100 for the resolver system is depicted in FIG. 1.

In some embodiments, the resolver system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 1 depicts an example operating environment 100 for the resolver system 199 according to some embodiments.

Example Operative Environment

Embodiments of the resolver system are now described. Referring now to FIG. 1, depicted is a block diagram illustrating an operating environment 100 for a resolver system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); a remote connected vehicle 124; and a sever 103. These elements are communicatively coupled to one another via a network 105. These elements of the operating environment 100 are depicted by way of illustration. In practice, the operating environment 100 may include one or more of the elements depicted in FIG. 1.

The operating environment 100 also includes the roadway environment 140. The roadway environment 140 was described above, and that description will not be repeated here.

In some embodiments, one or more of the ego vehicle 123, the remote connected vehicle 124, and the network 105 are elements of a vehicular micro cloud 194.

In some embodiments, the ego vehicle 123 and the remote connected vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and resolver system 199. These elements of the ego vehicle 123 and the remote connected vehicle 124 provide the same or similar functionality regardless of whether they are included in the ego vehicle 123 or the remote connected vehicle 124. Accordingly, the descriptions of these elements will not be repeated in this description for each of the ego vehicle 123 and the remote connected vehicle 124.

In the depicted embodiment, the ego vehicle 123 and the remote connected vehicle 124 store similar digital data. The system data 129 includes digital data that describes some or all of the digital data stored in the memory 127 or otherwise described herein.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 1 to indicate that it is an optional element of the operating environment 100.

In some embodiments, the vehicular micro cloud 194 includes a stationary vehicular micro cloud or a mobile vehicular micro cloud. For example, each of the ego vehicle 123 and the remote connected vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963.

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

In some embodiments, the operating environment 100 includes a plurality of vehicular micro clouds 194. For example, the operating environment 100 includes a first vehicular micro cloud and a second vehicular micro cloud.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote connected vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member. In some embodiments, the resource data 155 is an element of the member data 171.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the vehicular micro cloud 194 includes the server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote connected vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote connected vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153 (see, e.g., FIG. 2); a communication unit 145; an onboard unit 139; a memory 127; and a resolver system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the resolver system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 is a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the resolver system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the resolver system 199 provides its functionality as described herein with reference to the method 300 depicted in FIG. 3 and/or the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the resolver system 199 generates the set of nano clouds and assigns sub-tasks to the nano clouds based on the outcomes observed by the resolver system 199 during the execution of a set of digital twins that simulate the real-life circumstances of the ego vehicle 123.

For example, in some embodiments the resolver system 199 includes simulation software. The simulation software is any simulation software that is capable of simulating an execution of a vehicular micro cloud task by the vehicular micro cloud 194. For example, the simulation software is a simulation software that is capable of conducting a digital twin simulation. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the resolver system 199. In some other embodiments, the simulation software is a standalone software that the resolver system 199 can access to execute digital twin simulations to determine the best way to divide the vehicular micro cloud 194 into nano clouds and which sub-tasks to assign which nano clouds. The digital twin simulations may also be used by the resolver system 199 to determine how to break down the vehicular micro cloud task into sub-tasks.

Digital twins, and an example process for generating and using digital twins which is implemented by the resolver system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote connected vehicle 124, the ego vehicle 123, or some other tangible object or construct located in a roadway environment 140) is now described according to some embodiments. In some embodiments, the resolver system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the resolver system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the resolver system 199 to determine the lane of travel of the ego vehicle 123. This measurement improves the accuracy of the GPS data describing the location of lanes used by the ego vehicle 123 when the resolver system 199 is providing its functionality.

In some embodiments, the memory 127 stores two types of GPS data. The first is GPS data of the ego vehicle 123 and the second is GPS data of one or more objects (e.g., the remote connected vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the resolver system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the resolver system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the ego sensor data 195; the threshold data 196; the member data 171; the dynamic data 191; the V2X data 133; the remote sensor data 197; the ego application data 165; the remote application data 167; the context data 173; the resource data 155; the determination data 175; the digital twin data 162; the predetermined solutions data 169; the trigger data 174; the patch data 128; the resolution data 168; the learning data 172; the historical data 163; and the version data 134. The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

In some embodiments, the ego vehicle 123 includes a vehicle control system 153. A vehicle control system 153 includes one or more ADAS systems or an autonomous driving system. In some embodiments, the resolver system 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness resolver system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the resolver system 199 includes code and routines that are operable, when executed by the processor 125, to execute one or more steps of the example general method described herein. In some embodiments, the resolver system 199 includes code and routines that are operable, when executed by the processor 125, to execute one or more steps of the method 300 described below with reference to FIG. 3.

In some embodiments, the resolver system 199 includes code and routines that are operable, when executed by a processor 125, to cause the processor 125 to execute one or more of the steps of the example general method described herein. In some embodiments, the resolver system 199 includes code and routines that are operable, when executed by a processor 125, to cause the processor 125 to execute one or more of the steps of the method 300 described herein.

Figure 2:
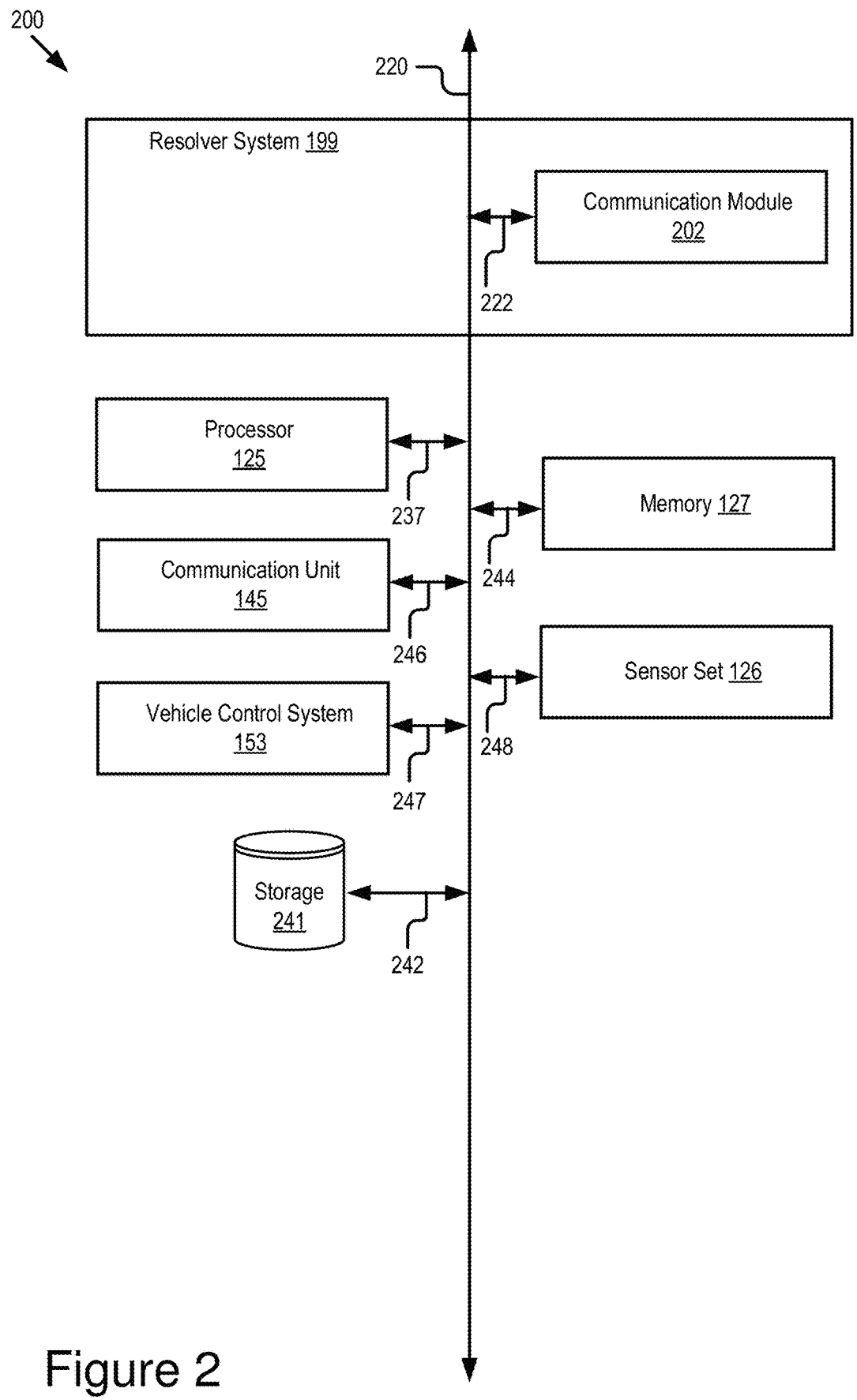
FIG. 2 is a block diagram illustrating an example computer system including a resolver system according to some embodiments.

An example embodiment of the resolver system 199 is depicted in FIG. 2. This embodiment is described in more detail below.

In some embodiments, the resolver system 199 is an element of the onboard unit 139 or some other onboard vehicle computer. In some embodiments, the resolver system 199 includes code and routines that are stored in the memory 127 and executed by the processor 125 or the onboard unit 139. In some embodiments, the resolver system 199 is an element of an onboard unit of the ego vehicle 123 which executes the resolver system 199 and controls the operation of the communication unit 145 of the ego vehicle 123 based at least in part on the output from executing the resolver system 199.

In some embodiments, the resolver system 199 is implemented using hardware including a field-programmable gate array ("FPGA") or an application-specific integrated circuit ("ASIC"). In some other embodiments, the resolver system 199 is implemented using a combination of hardware and software.

The remote connected vehicle 124 includes elements and functionality which are similar to those described above for the ego vehicle 123, and so, those descriptions will not be repeated here. In some embodiments, the ego vehicle 123 and the remote connected vehicle 124 are members of a vehicular micro cloud 194.

The roadway environment 140 is now described according to some embodiments. In some embodiments, some, or all of the ego vehicle 123 and the remote connected vehicle 124 (or the set of remote connected vehicles 198) are located in a roadway environment 140. In some embodiments, the roadway environment 140 includes one or more vehicular micro clouds 194. The roadway environment 140 is a portion of the real-world that includes a roadway, the ego vehicle 123 and the remote connected vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 197. The remote sensor data 197 includes digital data that describes the sensor measurements recorded by the sensor set 126 of the remote connected vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server (not pictured). In some embodiments, the edge server is a connected processor-based computing device that includes an instance of the resolver system 199 and the other elements described above with reference to the ego vehicle 123 (e.g., a processor 125, a memory 127, a communication unit 145, etc.). In some embodiments, the roadway device is a member of the vehicular micro cloud 194.

In some embodiments, the edge server is one or more of the following: a hardware server; a personal computer; a laptop; a device such as a roadside unit; or any other processor-based connected device that is not a member of the vehicular micro cloud 194 and includes an instance of the resolver system 199 and a non-transitory memory that stores some or all of the digital data that is stored by the memory 127 of the ego vehicle 123 or otherwise described herein. For example, the memory 127 stores the system data (not pictured). The system data includes some or all of the digital data depicted in FIG. 1 as being stored by the memory 127.

In some embodiments, the edge server includes a backbone network. In some embodiments, the edge server includes an instance of the resolver system 199. The functionality of the resolver system 199 is described above with reference to the ego vehicle 123, and so, that description will not be repeated here.

The set of remote connected vehicles 198 includes one or more remote connected vehicles 124.

In some embodiments, the server 103 one or more of the following: a hardware server; a personal computer; a laptop; a device such as a roadside unit; or any other processor-based connected device that is not a member of the vehicular micro cloud 194 and includes an instance of the resolver system 199 and a non-transitory memory that stores some or all of the digital data that is stored by the memory 127 of the ego vehicle 123 or otherwise described herein. For example, the memory 127 stores the system data 129. The system data includes some or all of the digital data depicted in FIG. 1 as being stored by the memory 127. In some embodiments, the server 103 is operable to receive requests for patch data 128 from endpoints of the network 105 and provide patch data 128 to endpoints of the network 105 responsive to these requests.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote connected vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the resolver system 199 includes encryption keys for encrypting wireless messages and decrypting the wireless messages described herein.

Referring now to FIG. 2, depicted is a block diagram illustrating an example computer system 200 including a resolver system 199 according to some embodiments.

In some embodiments, the computer system 200 may include a special-purpose computer system that is programmed to perform one or more steps of one or more of the method 300 described herein with reference to FIG. 3 and the example general method described herein.

In some embodiments, the computer system 200 may include a processor-based computing device. For example, the computer system 200 may include an onboard vehicle computer system of the ego vehicle 123 or the remote connected vehicle 124.

The computer system 200 may include one or more of the following elements according to some examples: the resolver system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the resolver system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the resolver system 199 includes code and routines that are operable, when executed by the processor 125, to cause the processor 125 to execute one or more steps of the method 300 described herein with reference to FIG. 3. In some embodiments, the resolver system 199 includes code and routines that are operable, when executed by the processor 125, to cause the processor 125 to execute one or more steps of the example general method.

In the illustrated embodiment shown in FIG. 2, the resolver system 199 includes a communication module 202.

The communication module 202 can be software including routines for handling communications between the resolver system 199 and other components of the computer system 200. In some embodiments, the communication module 202 can be a set of instructions executable by the processor 125 to provide the functionality described below for handling communications between the resolver system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the resolver system 199 and stores the data in one or more of the storage 241 and the memory 127.

In some embodiments, the communication module 202 may handle communications between components of the resolver system 199 or the computer system 200.

Referring now to FIG. 3, depicted is a flowchart of an example method 300. The method 300 includes step 305, step 310, step 315, step 320, step 325, and step 330 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

The existing solutions do not utilize vehicular micro clouds to resolve version differences among common vehicle applications installed in different connected vehicles. The existing references also do not describe vehicular micro clouds as described herein. Some of the existing solutions require the use of vehicle platooning. A platoon is not a vehicular micro cloud and does not provide the benefits of a vehicular micro cloud, and some embodiments of the resolver system that require a vehicular micro cloud. For example, among various differences between a platoon and a vehicular micro cloud, a platoon does not include a hub or a vehicle that provides the functionality of a hub vehicle. By comparison, in some embodiments the resolver system includes codes and routines that are operable, when executed by a processor, to cause the processor to utilize vehicular micro clouds to resolve version differences among common vehicle applications installed in different connected vehicles.

The existing references do not track version differences for common applications among various connected vehicles as is done by the resolver system described herein. By comparison, in some embodiments the resolver system includes codes and routines that are operable, when executed by a processor, to cause the processor to track version differences for common applications among various connected vehicles as is done by the resolver system described herein (e.g., by way of the resolver system keeping track of the ego application data and the remote application data for at least one remote connected vehicle).

The existing references also do not determine the missing functionality M for older versions of a common application (relative to the most recently released version of the common application) installed in a remote connected vehicle. By comparison, in some embodiments the resolver system includes codes and routines that are operable, when executed by a processor, to cause the processor to determine the missing functionality M for older versions of a common application (relative to the most recently released version of the common application) installed in a remote connected vehicle.

The existing references also do not form vehicular micro clouds responsive to identifying a common vehicle application having missing functionality M when compared to the functionality of the most recently released version of the common vehicle application. By comparison, in some embodiments the resolver system described herein includes code and routines that are operable, when executed by a processor, to form one or more vehicular micro clouds responsive to identifying a common vehicle application having missing functionality M when compared to the functionality of the most recently released version of the common vehicle application.

The existing references do not determine a set of tasks (e.g., a set of vehicular micro cloud tasks and/or sub-tasks) to be executed by the members of a vehicular micro cloud in order to provide a remote connected vehicle (e.g., an "aided vehicle") with an outcome that mitigates the negative impact of missing functionality M which is identified for the version of a vehicle application which is installed on the remote connected vehicle. By comparison, in some embodiments the resolver system described herein includes code and routines that are operable, when executed by a processor, to cause the processor to determine a set of tasks (e.g., a set of vehicular micro cloud tasks and/or sub-tasks) to be executed by the members of a vehicular micro cloud in order to provide a remote connected vehicle (e.g., an "aided vehicle") with an outcome that mitigates the negative impact of missing functionality M which is identified for the version of a vehicle application which is installed on the remote connected vehicle.

The existing references do not disclose a system that includes code and routines that are operable to execute the following steps: (1) identify version differences in a vehicle application that is installed in at least one remote connected vehicle and the ego vehicle (a "common vehicle application"); (2) trigger the formation of a vehicular micro cloud responsive to the identification of the version difference in the common vehicle application [e.g., the members are the ego vehicle and the remote connected vehicles that transmitted a V2X message that is received by the ego vehicle as described above]; (3) determine which of the vehicles from among the ego vehicle and the at least one remote connected vehicle has the highest version or most recent version of the common vehicle application [or the most feature rich version of the common vehicle application]; (4) determine the functional differences in the version of the common vehicle application installed in the ego vehicle and the at least one remote connected vehicle [e.g., determine the delta between the most recent version of the common vehicle application and the older version(s) of the common vehicle application]; (5) determine what computing resources are needed to minimize the functional differences between the most recent version of the common vehicle application and the older version(s) of the common vehicle application; (6) analyze the computing resources of the ego vehicle and the at least one remote connected vehicles to determine a maximum possible functionality that is achievable for the execution of the common vehicle application given the computing resources available within the vehicular micro cloud [e.g., the computing resources that the members of the vehicular micro cloud make available for use by the other members of the vehicular micro cloud]; (7) determine, based at least in part on one or more of the functional differences in the version of the common vehicle application installed in the ego vehicle and the at least one remote connected vehicle and the computing resources of the ego vehicle and the at least one remote connected vehicles, a set of tasks to be completed in order for the members of the vehicular micro cloud to create an outcome that is equal to or equivalent to the maximum possible functionality that is achievable for the execution of the common vehicle application given the computing resources available within the vehicular micro cloud; (8) determine, based at least in part on the computing resources of the members of the vehicular cloud, which tasks should be assigned to which members of the vehicular micro cloud and a timing for the completion of each task; (9) build a V2X message for each member including digital data describing the task(s) assigned to them and/or the other members of the vehicular micro cloud [this may include information informing a member that they do not need to execute a task] and the timing for the completion of this task or these tasks; and (10) cause the members of the vehicular micro cloud to complete their assigned task so that the maximum possible functionality of the vehicular micro cloud is achieved.

By comparison, in some embodiments the resolver system includes codes and routines that are operable, when executed by a processor, to cause the processor to execute one or more of the following steps: (1) identify version differences in a vehicle application that is installed in at least one remote connected vehicle and the ego vehicle (a "common vehicle application"); (2) trigger the formation of a vehicular micro cloud responsive to the identification of the version difference in the common vehicle application [e.g., the members are the ego vehicle and the remote connected vehicles that transmitted a V2X message that is received by the ego vehicle as described above]; (3) determine which of the vehicles from among the ego vehicle and the at least one remote connected vehicle has the highest version or most recent version of the common vehicle application [or the most feature rich version of the common vehicle application]; (4) determine the functional differences in the version of the common vehicle application installed in the ego vehicle and the at least one remote connected vehicle [e.g., determine the delta between the most recent version of the common vehicle application and the older version(s) of the common vehicle application]; (5) determine what computing resources are needed to minimize the functional differences between the most recent version of the common vehicle application and the older version(s) of the common vehicle application; (6) analyze the computing resources of the ego vehicle and the at least one remote connected vehicles to determine a maximum possible functionality that is achievable for the execution of the common vehicle application given the computing resources available within the vehicular micro cloud [e.g., the computing resources that the members of the vehicular micro cloud make available for use by the other members of the vehicular micro cloud]; (7) determine, based at least in part on one or more of the functional differences in the version of the common vehicle application installed in the ego vehicle and the at least one remote connected vehicle and the computing resources of the ego vehicle and the at least one remote connected vehicles, a set of tasks to be completed in order for the members of the vehicular micro cloud to create an outcome that is equal to or equivalent to the maximum possible functionality that is achievable for the execution of the common vehicle application given the computing resources available within the vehicular micro cloud; (8) determine, based at least in part on the computing resources of the members of the vehicular cloud, which tasks should be assigned to which members of the vehicular micro cloud and a timing for the completion of each task; (9) build a V2X message for each member including digital data describing the task(s) assigned to them and/or the other members of the vehicular micro cloud [this may include information informing a member that they do not need to execute a task] and the timing for the completion of this task or these tasks; and (10) cause the members of the vehicular micro cloud to complete their assigned task so that the maximum possible functionality of the vehicular micro cloud is achieved.

Referring now to FIG. 4, depicted is a block diagram of an example use case 400 of the resolver system according to some embodiments. The example use cases 400, 500 of FIG. 4 and FIG. 5 are related to one another and each involve the functionality of an embodiment of the resolver system to resolve version differences in a vehicle application to manage an intersection having a four-way stop sign among a set of remote connected vehicles The example use cases 400, 500 are illustrative and not limiting. For example, the functionality of the resolver system works for any vehicle application and not just an ADAS system to manage the operation of a vehicle when present at an intersection having a four-way stop sign as depicted in FIGS. 4 and 5.

As depicted in FIG. 4, four vehicles A, B, C, and D approach an intersection having a four-way stop sign. Each of these vehicles have a common vehicle application, e.g., an ADAS system for managing their operation while present in a roadway context involving an intersection having a four-way stop sign. Each of these vehicles also has an instance of the resolver system. Vehicle B is the ego vehicle and Vehicles A, C, and D are remote connected vehicles. Each of the remote connected vehicles transmits V2X messages having V2X data including, among other things, their remote application data; this transmission is caused by the resolver systems of these remote connected vehicles.

The resolver system of the ego vehicle receives the V2X messages and determines the following based on its analysis of the remote application data: vehicle A has Ver2 (or version 2) of the common vehicle application; vehicle C has Ver2 (or version 2) of the common vehicle application; vehicle D has Ver1 (or version 1) of the common vehicle application; and the ego vehicle, i.e., vehicle B, has the most recently released version of the common vehicle application, specifically Ver3 (version 3).

The resolver system of the ego vehicle identifies the functional differences in the versions of the common vehicle application as follows: Ver3 provides its functionality using a comprehensive safety evaluation; Ver2 provides its functionality using camera data; Ver1 provides it functionality based on tracking arrival times for the vehicles at the intersection. Ver3 may include the functionality of both Ver1 and Ver2, whereas Ver2 does not include all of the functionality of Ver3 but all the functionality of Ver1 and Ver1 does not include all the functionality of Ver3 or Ver2. Accordingly, the resolver system of the ego vehicle identifies functional differences among the different versions of the common vehicle application. In some embodiments, the resolver system of the ego vehicle provides this functionality by analyzing the remote application data received from the remote connected vehicle, the ego application data, and the version data for the common vehicle application.

The resolver system determines how much time would be necessary to install a software patch for vehicles A, C, and D so that their version of the common vehicle application would be upgraded to Ver3. Responsive to determining that the threshold for latency is not satisfied by the time necessary to install the software patch for vehicles A, C, and D, the resolver system of the ego vehicle forms the vehicular micro cloud including vehicles A, B, C, and D. FIG. 5 depicts a continuation of this example. In FIG. 5 the vehicles A, B, C, and D are members of the vehicular micro cloud.

Referring now to FIG. 5, depicted is a block diagram of an example use case 500 of the resolver system including a vehicular micro cloud according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data resolver system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data resolver system to become coupled to other data resolver systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by a processor of an ego vehicle, the method comprising:
   determining a common vehicle application that is installed in both a remote connected vehicle and an ego vehicle and identifying a difference in a first version of the common vehicle application installed in the remote connected vehicle and a second version of the common vehicle application installed in the ego vehicle;
   forming a vehicular micro cloud including the ego vehicle and the remote connected vehicle responsive to the difference being identified;
   determining, by a processor of the ego vehicle, a maximum possible functionality of the common vehicle application;
   determining a set of tasks to be completed to achieve the maximum possible functionality;
   assigning a first subset of the set of tasks to the ego vehicle and a second subset of the set of tasks to the remote connected vehicle, wherein collectively the first subset and the second subset include each of the tasks in the set of tasks; and
   using the vehicular micro cloud to cause the ego vehicle to complete the first subset and the remote connected vehicle to complete the second subset so that the maximum possible functionality of the common application is achieved.

2. The method of claim 1, wherein the common vehicle application includes a vehicle control system.

3. The method of claim 1, wherein the common vehicle application includes an autonomous driving system.

4. The method of claim 1, wherein the common vehicle application includes an Advanced Driver Assistance System.

5. The method of claim 1, wherein the maximum possible functionality includes the functionality of a most recently released version of the common vehicle application.

6. The method of claim 1, wherein the maximum possible functionality includes less functionality than a most recently released version of the common vehicle application.

7. The method of claim 1, wherein the vehicular micro cloud provides functionality that benefits each member of the vehicular micro cloud.

8. The method of claim 1, further comprising parsing V2X data from a wireless message received from the ego vehicle, wherein the V2X data includes remote application data that describes a first set of applications installed in the remote connected vehicle and first version information for the first set of applications, wherein ego application data describes a second set of applications installed in the ego vehicle and second version information for the second set of applications.

9. The method of claim 8, wherein the common vehicle application is determined based on comparison of the remote application data and the ego application data.

10. The method of claim 8, wherein the V2X data includes member data describing a first hardware capability of the remote vehicle.

11. The method of claim 10, wherein the maximum possible functionality of the common vehicle application is determined by the processor of the ego vehicle based on one or more of: the first hardware capability of the remote vehicle; a second hardware capability of the ego vehicle; the first version information; and the second version information.

12. The method of claim 1, wherein the vehicular micro cloud includes each member of the vehicular micro cloud sharing their unused computing resources with one another to complete the set of tasks for a benefit of each member of the vehicular micro cloud.

13. The method of claim 12, wherein the benefit includes reducing a risk of a collision by resolving vehicle application version differences among members of the vehicular micro cloud.

14. A system of an ego vehicle comprising:
   a communication unit;
   a non-transitory memory;
   and a processor communicatively coupled to the communication unit and the non-transitory memory, wherein the non-transitory memory stores computer readable code that is operable, when executed by the processor, to cause the processor to execute steps including:
   determining a common vehicle application that is installed in both a remote connected vehicle and an ego vehicle and identifying a difference in a first version of the common vehicle application installed in the remote connected vehicle and a second version of the common vehicle application installed in the ego vehicle;
   forming a vehicular micro cloud including the ego vehicle and the remote connected vehicle responsive to the difference being identified;
   determining, by a processor of the ego vehicle, a maximum possible functionality of the common vehicle application;
   determining a set of tasks to be completed to achieve the maximum possible functionality;
   assigning a first subset of the set of tasks to the ego vehicle and a second subset of the set of tasks to the remote connected vehicle, wherein collectively the first subset and the second subset include each of the tasks in the set of tasks; and
   causing the ego vehicle to complete the first subset and the remote connected vehicle to complete the second subset so that the maximum possible functionality of the common application is achieved.

15. The system of claim 14, further comprising parsing V2X data from a wireless message received from the ego vehicle, wherein the V2X data includes remote application data that describes a first set of applications installed in the remote connected vehicle and first version information for the first set of applications, wherein ego application data describes a second set of applications installed in the ego vehicle and second version information for the second set of applications.

16. The system of claim 15, wherein the common vehicle application is determined based on comparison of the remote application data and the ego application data.

17. The system of claim 15, wherein the V2X data includes member data describing a first hardware capability of the remote vehicle.

18. The system of claim 17, wherein the maximum possible functionality of the common vehicle application is determined by the processor of the ego vehicle based on one or more of: the first hardware capability of the remote vehicle; a second hardware capability of the ego vehicle; the first version information; and the second version information.

19. A computer program product of an ego vehicle including computer code stored on a non-transitory memory that is operable, when executed by an onboard vehicle computer of the ego vehicle, to cause the onboard vehicle computer to execute operations including:
  determine a common vehicle application that is installed in both a remote connected vehicle and an ego vehicle and identifying a difference in a first version of the common vehicle application installed in the remote connected vehicle and a second version of the common vehicle application installed in the ego vehicle;
  form a vehicular micro cloud including the ego vehicle and the remote connected vehicle responsive to the difference being identified;
  determine a maximum possible functionality of the common vehicle application;
  determine a set of tasks to be completed to achieve the maximum possible functionality;
  assign a first subset of the set of tasks to the ego vehicle and a second subset of the set of tasks to the remote connected vehicle, wherein collectively the first subset and the second subset include each of the tasks in the set of tasks; and
  cause the ego vehicle to complete the first subset and the remote connected vehicle to complete the second subset so that the maximum possible functionality of the common application is achieved.

20. The computer program product of claim 19, wherein the non-transitory memory stores additional computer code that is operable, when executed by the onboard vehicle computer, to cause the onboard vehicle computer to execute additional operations including:
  parse V2X data from a wireless message received from the ego vehicle, wherein the V2X data includes remote application data that describes a first set of applications installed in the remote connected vehicle and first version information for the first set of applications, wherein ego application data describes a second set of applications installed in the ego vehicle and second version information for the second set of applications; and
  compare the remote application data and the ego application data to identify the common vehicle application based on the comparison.

* * * * *